May 5, 1970 J. G. D. ANDREW 3,510,084
FISHING REEL ATTACHMENT
Filed July 20, 1967
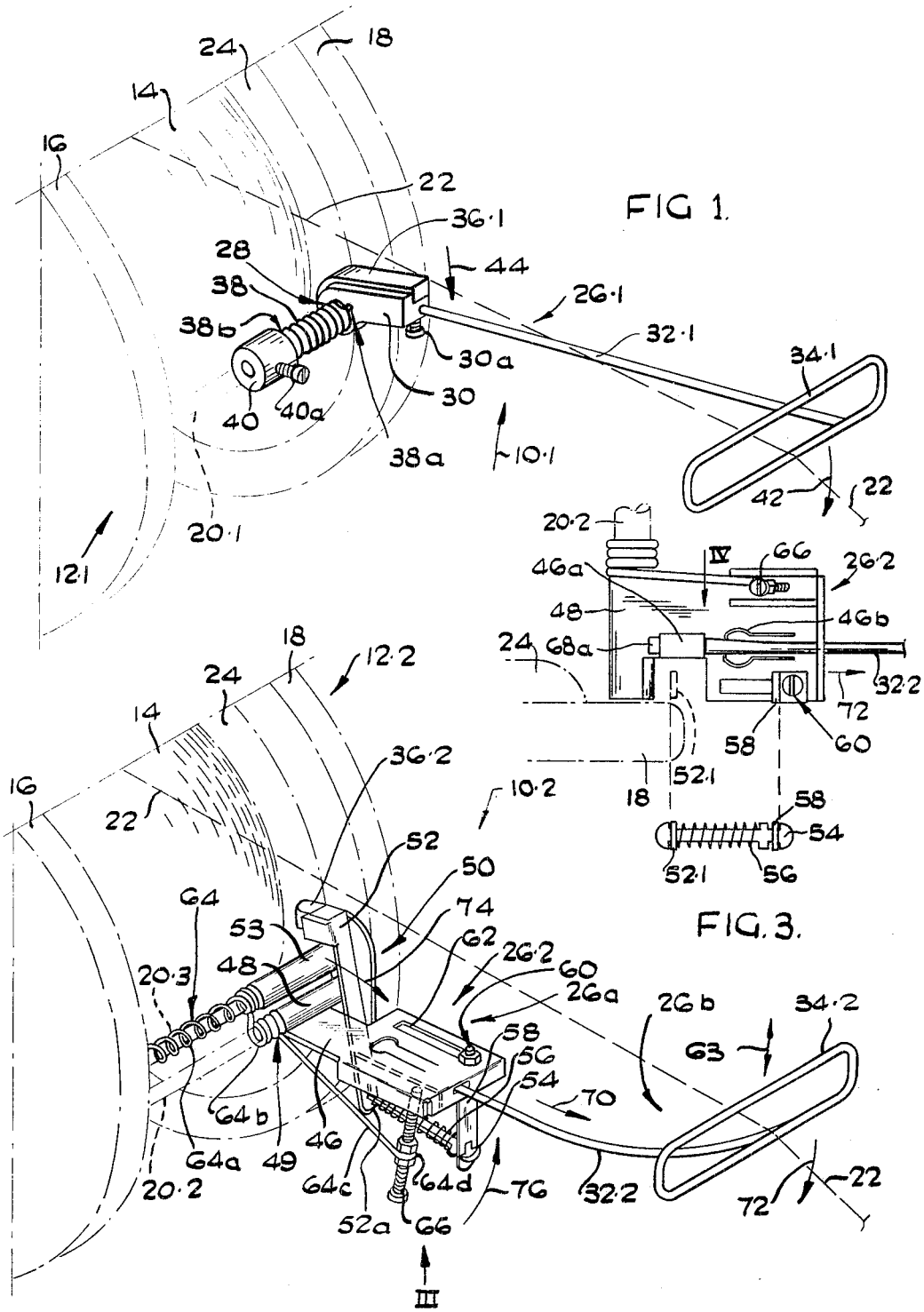
FIG. 1.
FIG. 2.
FIG. 3.
FIG. 4.
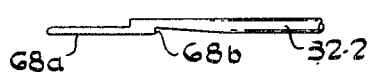
INVENTOR:
John Gilbert Drake Andrew
By Jardine & Davidson
Attorneys

United States Patent Office 3,510,084
Patented May 5, 1970

---

3,510,084
FISHING REEL ATTACHMENT
John Gilbert Drake Andrew, Umzumbe, Natal, Republic of South Africa, assignor to Scott Patrick Trading Company (Proprietary) Limited, Umzumbe, Natal, Republic of South Africa
Filed July 20, 1967, Ser. No. 654,787
Claims priority, application Republic of South Africa, Sept. 27, 1966, 66/5,845
Int. Cl. A01k 89/02
U.S. Cl. 242—84.52
7 Claims

ABSTRACT OF THE DISCLOSURE

A brake attachment for removable connection to the crossbars of a fishing reel frame includes a brake pivoted on one crossbar and engageable with the spool of the reel, a deflector arm pivoted on another crossbar and terminating in a line guide, a bracket connecting the deflector arm to the brake, and a spring to normally, lightly urge the brake against the spool. During casting, tension in the line being forcibly unwound acts through the guide on the deflector arm to pivot the deflector arm and brake connected thereto to lift the brake away from the spool to allow free unwinding until the tension in the line is relaxed at the end of the case at which time the spring means biases the brake back into engagement with the spool to prevent it from unwinding excess line (backlash). An alternative arrangement provides the pivoted deflector arm with a brake on a crossbar of the reel frame and a spring coiled around the same cross arm to lightly bias the brake into engagement with the spool. A lock collar at one end of the spring provides an adjustment of the bias again at the deflector arm and its brake.

---

The present invention relates to a fishing reel attachment.

More particularly the invention relates to a fishing reel attachment adapted for attachment to a fishing rod reel having a spool rotatably mounted between opposing axially spaced cheek plates, and having at least one removable cross bar of circular cross-section connecting the two cheek plates.

According to the invention, a fishing reel attachment comprises:

(a) a deflector arm having a bore for receiving a cross bar slidably and for supporting it pivotally about the axis of one of the cross bars, the deflector arm extending transversely away from the cross bar and having a guide adapted to receive a fishing line wound on the spool for passing therethrough;
(b) brake means operatively connected to the deflector arm; and
(c) bias means urging the brake means into engagement with the spool to retard rotation about its axis;

the deflector arm being arranged to pivot about its pivotal axis against the bais when the fishing line is taut and when it bears against the guide.

Locating means may be provided for locating the deflector arm resiliently in an axial direction along the axis of the bore of the deflector arm.

The bias means may include a lock collar and a coil spring adapted to pass over the cross bar, the coil spring having engaging means for engaging at one end with the deflector arm and at its other end with the lock collar, the lock collar having means for locking it adjustably in position on the cross bar to provide both axial and arcuate adjustment in position, relative to the cross bar, thereby providing adjustment in the degree of bias applied to the deflector arm.

In case where a fishing reel has at least two parallel and closely spaced cross bars, the brake means of the attachment may include a brake lever adapted for being pivotally mounted on the second cross bar, and a link connecting the deflector arm to the brake lever. In this case, the bias means may include a coil spring co-axial with the bore of the deflector arm and having a resilient spring arm extending transversely away from the axis of the spring, and an adjustable stop bearing on the deflector arm and engaging with the resilient spring arm for providing adjustment in the action of the bias acting on the deflector arm. The deflector arm may include at least two parts, viz, a pivotal mount and a guide part, the guide part having the guide and a stem, the pivotal mount having the bore to receive the first cross bar and also having a socket to receive the end of the stem removably.

The invention will now be described by way of example with reference to the accompanying schematic drawings.

In the drawings:
FIG. 1 shows a pictorial view of one embodiment of a fishing reel attachment;
FIG. 2 shows a pictorial view of another embodiment of the fishing reel attachment;
FIG. 3 shows a sectional view of part of the attachment as seen in the direction of arrow III in FIG. 2; and
FIG. 4 shows a view of the end of the deflector arm as seen in the direction of arrow IV in FIG. 3 of the end of the guide part.

Referring to FIG. 1, the fishing reel attachment, generally indicated by reference numeral 10.1, is shown when attached on a fishing rod reel, generally indicated by reference numeral 12.1 and shown in broken lines.

The fishing rod reel 12.1 includes a spool 14 rotatably mounted between two opposing axially spaced cheek plates 16 and 18 and has a removable cross bar 20.1 of circular cross-section connecting the two cheek plates 16 and 18. Attached to the spool 14 on which fishing line 22 is wound, is a flange 24.

The fishing reel attachment 10.1 comprises a deflector arm generally indicated by reference numeral 26.1. The deflector arm 26.1 has a bore 28 in block 30 for slidably receiving the cross bar 20.1, and it further has a guide in the form of a rod 32.1 carrying at the free end an elongated loop 34.1. Through the loop 34.1 the fishing line 22 extends. The block 30 is provided with a locking screw 30a for attachment of the rod 32.1 thereto.

The fishing reel attachment 10.1 also includes brake means in the form of a brake shoe 36.1 made of rubber. This brake shoe 36.1 is mounted on the block 30 forming part of the deflector arm and being eccentrically mounted on the cross bar 20.1.

The fishing reel attachment 10.1 further includes bias means in the form of a spring 38 which is attached at one end 38a to the block 30 and at the other end 38b to a locking collar 40. The locking collar 40 is provided with a screw 40a for attaching it to the cross bar 20.1. The spring 38 and the locking collar 40 provide for both axial and arcuate adjustment on the cross bar 20.1.

The operation of the fishing reel attachment as illustrated in FIG. 1 is as follows:

When the fishing line 22 is taut, i.e. acting on the rod 32.1 in the direction indicated by arrow 42, the brake shoe 36.1 will be pulled in the direction indicated by arrow 44 against the action of spring 38.

When the fishing line 22 is slack, i.e. for example, just after having cast, there will be no or a relatively small force acting on the rod 32.1. The spring 38 will therefore move the brake 36.1 in the direction oposite to that indicated by arrow 44 so that brake shoe 36.1 will come into contact with the flange 24 for retardation and stopping thereof, if the spool 14 and thereby the flange 24 be turning.

Referring now to FIGS. 2 to 4, the fishing reel attachment, generally indicated by reference numeral 10.2, is shown as attached to a fishing rod reel, generally indicated by reference nummeral 12.2 and shown in broken lines. This fishing rod reel 12.2 corresponds substantially to the fishing rod reel 12.1 illustrated in FIG. 1 and equivalent parts will be indicated by equivalent reference numerals. The fishing rod reel 12.2 is, however, provided with both a first removable cross bar 20.2 and a second removable cross bar 20.3 of circular cross-section connecting the two cheek plates 16 and 18.

The fishing reel attachment 10.2 includes a deflector arm 26.2. The deflector arm 26.2 includes two parts, i.e. a pivotal mount 26a and a guide part 26b. The pivotal mount 26a includes base plate 46, which is formed at one end into a cylindrical end 48 defining a bore 49 for receiving the first cross bar 20.2.

The brake means 50 includes a brake lever 52 attached to a sleeve 53 which is pivotally mounted on the second cross bar 20.3. The free end 52a of the brake lever is connected by means of a link 54 and a coil spring 56 to a bracket 58 attached to and extending away from the base plate 46, which forms part of the deflector arm 26.2. The bracket 58 is connected by means of a bolt and nut arrangement 60 to fit slidably into a cut-out 62 provided in the plate 46. By adjustment of the screw arrangement 60 of the bracket 58 along the cut-out 62, the guide part 26b alters its position either upwards or downwards as indicated by arrow 63, thereby causing the line 22 to have more or less angle between the first eye on the fishing rod and the spool 14 as may be required.

Bias means is provided in the form of a coil spring 64 having a first part 64a through which the second cross bar 20.3 passes and which abuts at one end to the cheek plate 16. The second part 64b of the coil spring 64 receives the first cross rod 20.2 and abuts against the cylindrical sleeve 48. A straight part 64c extends from the first cross rod 20.2 to form an eye 64d through which an adjusting screw arrangement 66 passes. By adjustment of this adjusting screw arrangement 66, the tension in the coil spring 64 can be adjusted as may be required.

The guide part 26b of the deflector arm 26.2 includes a rod 32.2 having at the free end thereof a loop-shaped part 34.2 through which the line 22 passes. The other end of the rod 32.2 is shaped to have a flattened free end stem 68a and a notch 68b. The free end 68a fits into an abutment plate 46a bent out of the base plate 46 and the notch 68b receives a clipping member 46b bent out of the base plate 46. The function of this clipping member 46b is to prevent withdrawal of the rod 32.2 in the direction indicated by arrow 70.

The brake lever arm 52 is provided with a brake shoe 36.2 made of rubber.

The operation of the device illustrated in FIGS. 2 to 4, is as follows:

When the line 22 is tensioned, a pulling action is exerted on the rod 32.2 as indicated by reference numeral 72. This action results in the brake lever 52 being moved in the direction indicated by arrow 74. Therefore the braking shoe 36.2 is not in contact with the flange 24.

When the line 22 is slack, the spring 64 will act on the base plate 46 so as to move it in the direction indicated by arrow 76. Thereby the bracket 58 and accordingly the brake lever 52 are moved in a direction opposite to that indicated by reference numeral 74 so that the braking shoe 36.2 will come into contact with the flange 24 so as to retard or stop it.

I claim:

1. A fishing reel attachment adapted for removable attachment to a fishing rod reel having a spool rotatably mounted between opposing axially spaced cheek plates, and having at least one removable cross bar of circular cross section connecting the two cheek plates and at least one other cross bar parallel to and closely spaced from said removable cross bar, the fishing reel attachment comprising (a) a deflector arm having a bore for receiving a cross bar slidably and for supporting the arm pivotally about the axis of one of the cross bars, the deflector arm extending transversely away from the cross bar, and having a guide adapted to receive a fishing line wound on the spool for passing therethrough;

(b) brake means including a brake lever adapted for being pivotally mounted on said other cross bar, and a bracket connecting the deflector arm to the brake lever; and (c) bias means adapted to be operatively connected between a fixed point of the reel and the deflector arm and adapted to urge the brake means, via movement of the deflector arm about its pivotal axis into engagement with the spool to retard rotation of the spool about its axis, said bias means including a coil spring coaxial with the bore of the deflector arm and having a resilient spring arm extending transversely away from the axis of the spring and an adjustable stop bearing on the deflector arm and engaging with the resilient spring arm for providing adjustment in the action of the bias acting on the deflector arm, the deflector arm being arranged to pivot about its pivotal axis against the bias when the fishing line is taut and when it bears against the guide.

2. A fishing reel attachment adapted for removable attachment to a fishing rod reel having a spool rotatably mounted between opposing axially spaced cheek plates, and having at least one removable cross bar of circular cross section connecting the two cheek plates, and at least one other cross bar parallel to and closely spaced from said removable cross bar, the fishing reel attachment comprising (a) a deflector arm having a bore for receiving a cross bar slidably and for supporting the arm pivotally about the axis of one of the cross bars, the deflector arm extending transversely away from the cross bar, and having a guide adapted to receive a fishing line wound on the spool for passing therethrough;

(b) locating means for locating the deflector arm in an axial direction along the axis of the bore of the deflector arm;

(c) brake means including a brake lever adapted for being pivotally mounted on said other cross bar, and a bracket connecting the deflector arm to the brake lever; and (d) bias means adapted to be operatively connected between a fixed point of the reel and the deflector arm and adapted to urge the brake means, via movement of the deflector arm about its pivotal axis into engagement with the spool to retard rotation of the spool about its axis, said bias means including a coil spring coaxial with the bore of the deflector arm and having a resilient spring arm extending transversely away from the axis of the spring and an adjustable stop bearing on the deflector arm and engaging with the resilient spring arm for providing adjustment in the action of the bias acting on the deflector arm, the deflector arm being arranged to pivot about its pivotal axis against the bias when the fishing line is taut and when it bears against the guide.

3. An attachment according to claim 2, in which the deflector arm includes at least two parts, namely a pivotal mount and a guide part, the guide part having the guide and a stem, the pivotal mount having the bore to receive the first cross bar and having also a socket to receive the end of the stem removably.

4. A fishing reel attachment adapted for removable attachment to a fishing rod reel having a spool rotatably mounted between opposing axially spaced cheek plates, and having at least one removable cross bar of circular cross section connecting the two cheek plates and at least one other cross bar parallel to and closely spaced from said removable cross bar, the fishing reel attachment comprising (a) a deflector arm having a bore for receiving a cross bar slidably and for supporting the arm pivotally about the axis of one of the cross bars, the deflector arm extending transversely away from the cross bar, and having a guide adapted to receive a fishing line wound on the spool for passing therethrough;

(b) brake means including a brake lever adapted for being pivotally mounted on the other cross bar, and a bracket operatively connecting the deflector arm and the brake lever;

(c) bias means adapted to be operatively connected between a fixed part of the reel and the deflector arm and adapted to urge the brake means, via the movement of the deflector arm about its pivotal axis, into engagement with the spool to retard rotation of the spool about its axis;

the deflector arm being arranged to pivot about its pivotal axis against the bias when the fishing line is taut and when it bears against the guide.

5. An attachment according to claim 4, in which locating means are provided for locating the deflector arm resiliently in an axial direction along the axis of the bore of the deflector arm.

6. An attachment according to claim 5, in which the deflector arm includes at least two parts, namely a pivotal mount and a guide part, the guide part having the guide and a stem, the pivotal mount having the bore to receive the first cross bar and having also a socket to receive the end of the stem removably.

7. An attachment according to claim 4, in which the deflector arm includes at least two parts, namely a pivotal mount and a guide part, the guide part having the guide and a stem, the pivotal mount having the bore to receive the first cross bar and having also a socket to receive the end of the stem removably.

References Cited

UNITED STATES PATENTS

| 2,487,316 | 11/1949 | Daniel. |
| 2,658,696 | 11/1953 | Cooper. |
| 2,753,129 | 7/1956 | Martin. |
| 3,370,807 | 2/1968 | Knauth. |

FOREIGN PATENTS

| 162,831 | 5/1955 | Australia. |

BILLY S. TAYLOR, Primary Examiner